United States Patent [19]

Beccaris et al.

[11] Patent Number: 4,676,356
[45] Date of Patent: Jun. 30, 1987

[54] MULTIPLE ROTATING DISK ASSEMBLY WITH ELASTIC SEPARATOR MEANS

[75] Inventors: Carlo Beccaris, Santena; Aldo Marchisio, Moncaelieri, both of Italy

[73] Assignee: Valeo, Paris, France

[21] Appl. No.: 658,156

[22] Filed: Oct. 5, 1984

[30] Foreign Application Priority Data

Oct. 18, 1983 [FR] France .................. 83 16577

[51] Int. Cl.⁴ ............................. F16D 13/52
[52] U.S. Cl. ......................... 192/70.28; 192/111 A
[58] Field of Search ............ 192/70.28, 70.27, 70.25, 192/70.21, 70.2, 111 A, 89 B

[56] References Cited

U.S. PATENT DOCUMENTS

| | | | |
|---|---|---|---|
| 2,174,240 | 9/1939 | Glenney | 192/69 |
| 2,199,801 | 5/1940 | Kattwinkel | 192/69 |
| 2,738,864 | 3/1956 | Becker | 192/69 |
| 2,743,790 | 5/1956 | Bricker | 188/196 R |
| 3,081,854 | 3/1963 | Snyder | 192/69 |
| 3,157,257 | 11/1964 | Root | 192/18 |
| 3,747,729 | 7/1973 | Storer | 192/70.28 |

FOREIGN PATENT DOCUMENTS

| | | | |
|---|---|---|---|
| 1020496 | 12/1957 | Fed. Rep. of Germany | 192/70.28 |
| 896942 | 3/1945 | France . | |
| 1242615 | 8/1960 | France . | |
| 691317 | 5/1953 | United Kingdom | 192/70.28 |

Primary Examiner—George H. Krizmanich
Attorney, Agent, or Firm—Charles E. Brown; Charles A. Brown

[57] ABSTRACT

A multiple rotating disk assembly comprises a stack of disks including first disks constrained to rotate with a first of two coaxial members and second disks alternating with the first disks and constrained to rotate with the second of the coaxial members. The first and second disks are movable axially relative to the coaxial members. Elastic separators are disposed between the first disks and adapted to urge them away from one another. The elastic separators have an elastic limit which is sufficiently low as to be systematically exceeded on each increase in the closeness of packing of the disks due to progressive wear of the friction surfaces carried by the latter, for at least part of the service life of the friction surfaces.

11 Claims, 15 Drawing Figures

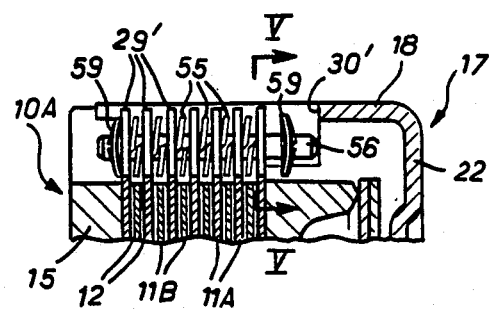
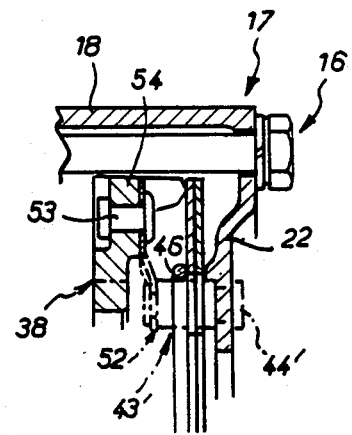
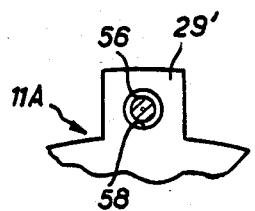
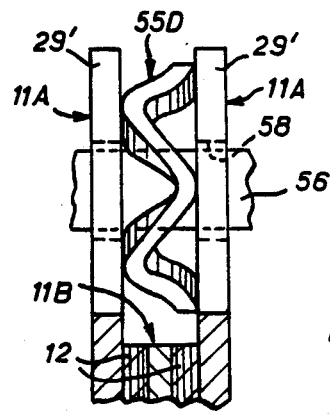
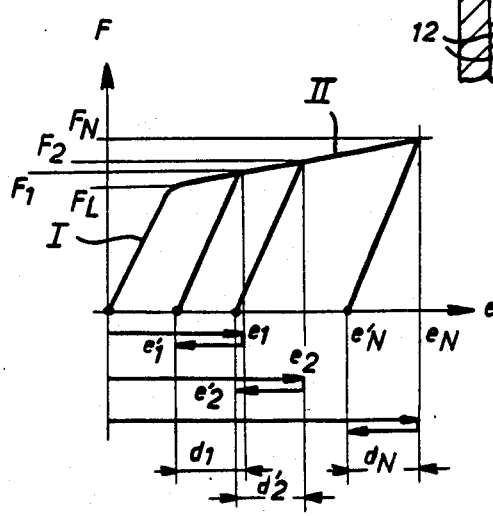
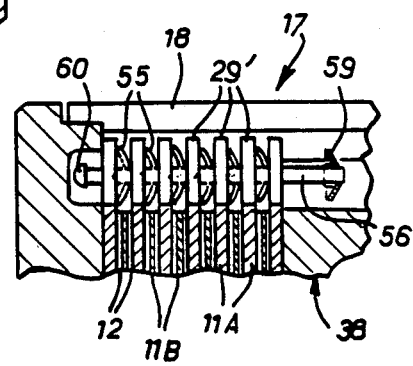

MULTIPLE ROTATING DISK ASSEMBLY WITH ELASTIC SEPARATOR MEANS

BACKGROUND OF THE INVENTION

1. Field of the Invention

The present invention generally concerns multiple rotating disk assemblies of the kind comprising two coaxial members of which one at least is a rotating member, a stack of disks including first disks constrained to rotate with a first of said coaxial members and second disks alternating with said first disks and constrained to rotate with the second of said coaxial members, said first and second disks being movable axially relative to said coaxial members, friction surfaces on transverse sides of at least some of said disks, and engagement means adapted to secure axial clamping of said friction surfaces between said disks.

This assembly may constitute a clutch, for example, of the type utilized on certain automotive vehicles and in particular on agricultural tractors.

One of the coaxial members is then a rotating member constrained to rotate with a first shaft, in practice a driving shaft, for example the output shaft or crankshaft of the motor of the vehicle concerned, while the other is a rotating member constrained to rotate with a second shaft, in practice a driven shaft, for example the input shaft of the associated gearbox.

When a clutch of this kind, the disks of which are usually immersed in an oil bath, is operated in order to disengage it, it is essential that the disks constrained to rotate with one of the coaxial members move sufficiently far away in the axial direction from those constrained to rotate with the other coaxial member, failing which there could arise between them an unwanted spurious driving torque, the so-called drag torque, of a kind prejudicial to the utilization of the driven shaft concerned, by virtue of the rotation to which these disks are still subject.

More specifically, this drag torque can make it difficult to engage a gear.

2. Description of the Prior Art

To minimize this drag torque by securing sufficient separation of the disks on disengagement of the clutch it has already been proposed, in particular in French Pat. No. 1 242 615, to associate with the disks constrained to rotate with one of the coaxial members, commonly referred to as intermediary disks, elastic separator members which, disposed axially between the intermediary disks, are adapted to urge them away from one another.

These may be helical coil springs, as described in French Pat. No. 1 242 615.

As an alternative, and as described in U.S. Pat. No. 3,157,257, they may comprise dished elastic annular members of the Belleville spring type, in which case they are usually retained in position by engaging them on support members carried by the associated intermediary disks. As described in U.S. Pat. No. 2,738,864, these support members may comprise tangs constituting an integral part of these intermediary disks.

Be this as it may, as is usual in the case of elastic members, the elastic limit of the elastic separator members thus used is always selected to have a sufficiently high value so as not to be exceeded in service.

In other words, it is currently commonly accepted that such elastic separator members should under no circumstances be subject to permanent deformation.

This arrangement has disadvantages, as will now be indicated.

First of all, when the friction surfaces are clamped between the disks, by virtue of actuation of the clutch engagment means, the elastic separator means associated with the intermediary disks are flattened in the axial direction and the aforementioned engagement means have to generate sufficient force in the axial direction both to overcome the oppositely directed axial force produced at this time by the elastic separator members and to provide for the transmission of a particular torque between the intermediary disks and the other disks.

The force which has to be produced in order to flatten an elastic separator member is proportional to this flattening, and this increases as the friction surfaces are progressively worn down.

Thus during the service life of the friction surfaces that part of the axial force produced by the engagement means needed for flattening the elastic separator means increases relative to that needed to transmit torque between the disks.

When the engagement means are implemented hydraulically it is possible to ensure that the axial force generated remains constant in spite of the fact that the travel progressively increases, since it is conditioned essentially by the hydraulic pressure used. This is not the case when the engagement means consist of a diaphragm spring, that is to say by the circumferentially continuous peripheral part, constituting a Belleville spring, of an annular member of which the central portion is subdivided into radial fingers to constitute clutch release levers by means of which the clutch may be actuated to disengage it.

The axial clamping force which a diaphragm spring of this kind can develop depends essentially on its initial characteristics and on the geometrical changes to which it is subject as the friction surfaces wear, due to the resulting variation in respect of the point on which it bears.

In other words, this axial force depends only on the diaphragm spring.

Thus with a diaphragm spring of this kind the part of the axial force necessary for flattening the elastic separator means increases at the expense of that available for transmitting torque between the disks.

Thus it is not possible to select the optimum diaphragm spring according only to this torque.

Moreover, as the elastic separator means may have different characteristics, the force elastically generated on releasing the clutch may also vary from one to another.

It is on this force that the moving apart of the intermediary disks concerned depends.

Thus it can happen that certain disks remain clamped when they should not, the force developed by the elastic separator members associated with the corresponding intermediary disks being less than that developed by others, and thus insufficient to balance the latter in a satisfactory manner.

A general objective of the present invention is an arrangement by means of which these disadvantages may be circumvented.

SUMMARY OF THE INVENTION

The object of the present invention is a multiple rotating disk assembly comprising two coaxial members, a stack of disks including first disks constrained to rotate with a first of said coaxial members and second disks alternating with said first disks and constrained to rotate with the second of said coaxial members, said first and second disks being movable axially relative to said coaxial members, friction surfaces on transverse sides of at least some of said disks, engagement means adapted to secure axial clamping of said friction surfaces between said disks, and elastic separator means disposed between said first disks and adapted to urge them away from one another, wherein said elastic separator means have an elastic limit which is sufficiently low as to be systematically exceeded on each increase in the closeness of packing of the disks due to progressive wear of the friction surfaces for at least part of the service life of said friction surfaces.

In practice, said elastic separator means preferably have an elastic limit which is sufficiently low as to be systematically exceeded on each increase in the closeness of the packing of the disks due to progressive wear of the friction surfaces from the beginning of the service life of said friction surfaces.

By virtue of an arrangement of this kind the force to be produced on engaging the clutch in order to flatten the elastic separator members advantageously remains constant, irrespective of the extent of such flattening or, in other words, the degree of wear of the friction surfaces, this force being determined only by the elastic limit of the elastic separator members.

Conjointly, on disengaging the clutch the force produced by each of the elastic separator members is substantially constant, as is therefore also the resulting travel of the intermediary disks on moving apart. As a constant and limited range of movement on moving apart is imposed on the intermediary disks, being conditioned by the elastic limit of the elastic separator members, the risk of unwanted spurious clamping of any of the other disks is with advantage minimized.

Where the elastic separator members are retained in position by being engaged on support members carried by the intermediary disks, these support members are preferably free to move axially relative to the intermediary disks and pass with clearance through each of the latter.

Being thus free to move radially and axially relative to the intermediary disks, they advantageously favor the lifting of the intermediary disks away from the other disks on disengaging the clutch, by subjecting them to mechanical forces derived from the loads to which they are themselves inevitably subjected on a vehicle.

This arrangement reinforces the effects of those previously described and the risk of unwanted clamping of the disks on releasing the clutch is advantageously further reduced.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIGS. 3 and 4 are partial views in axial cross-section of the multiple rotating disk assembly on the broken line III—III and the line IV—IV in FIG. 1, respectively.

FIG. 5 is a partial view of it in transverse cross-section on the line V—V in FIG. 3.

FIG. 7 is a diagram further illustrating such operation.

FIG. 8 is a partial view in axial crosssection corresponding to FIG. 3 and relating to an alternative embodiment.

FIG. 12 is a detail view similar to FIG. 6A for another embodiment of the spring separator means.

DESCRIPTION OF THE PREFERRED EMBODIMENTS

Figure 1:
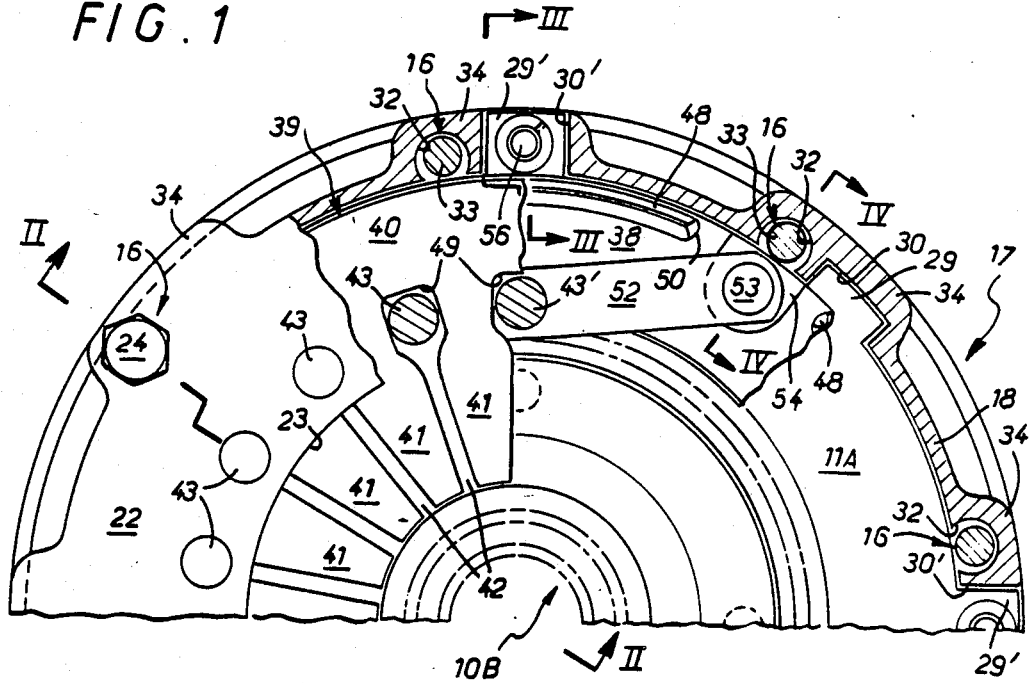
FIG. 1 is a partially cut away half-view in elevation of a multiple rotating disk assembly in accordance with the invention, seen in the direction of the arrow I in FIG. 2.
Figure 2:
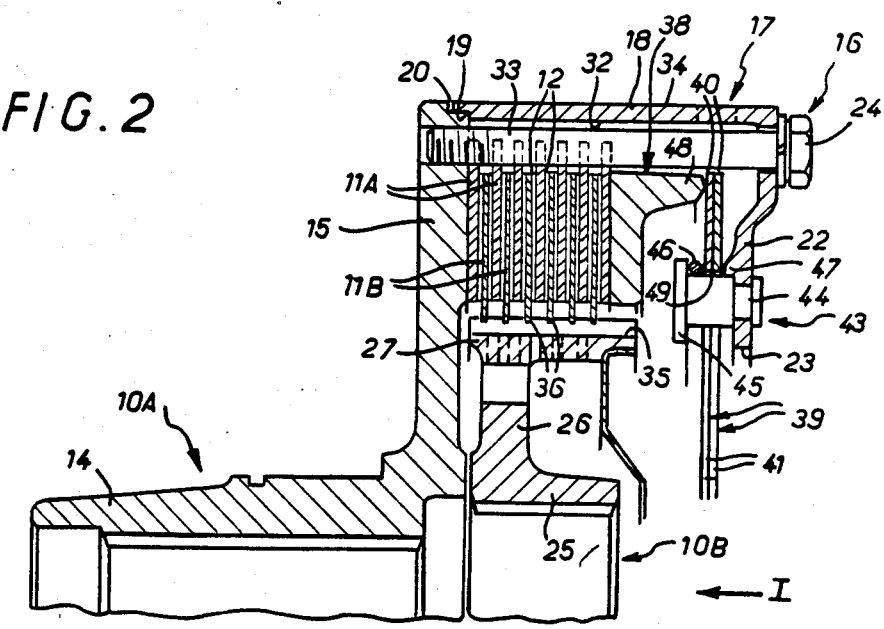
FIG. 2 is a half-view of it in axial cross-section on the broken line II—II in FIG. 1.

The figures show by way of example the application of the invention to a multiple disk clutch.

As is known per se, a multiple disk clutch generally comprises two coaxial members 10A, 10B which are in practice both rotating members, a stack of first and second disks 11A, 11B alternately constrained to rotate with respective rotating members 10A, 10B whilst being mobile in the axial direction relative thereto, friction surfaces 12 carried by certain at least of said disks 11A, 11B on their transverse surfaces, and engagement means adapted to secure axial clamping of said friction surfaces 12 between said disks 11A, 11B.

In the embodiments shown the rotating member 10A comprises an axial hub 14 through which it is adapted to be constrained to rotate with a first shaft, a driving shaft, for example, in practice the output shaft or crankshaft of the motor when equipping an automotive vehicle, and an annular transverse flange 15 forming a reaction plate.

As shown here, the annular flange 15 is integral with the hub 14; as an alternative, it may be a part distinct from the hub 14 and appropriately attached to the latter.

Be this as it may, attached to its outside perimeter by means of eight screws 16 in the embodiments shown is an annular member 17 usually referred to as the clutch cover, within which are accommodated inter alia the rotating member 10B and the disks 11A, 11B.

In practice, the cover 17 comprises an integral axial ring 18 with a rebate 19 by means of which it is engaged on a complementary rebate 20 in the flange 15 of the rotating member 10A and an annular transverse flange 22 having an opening 23 in its central portion and on which the head 24 of each of the screws 16 bears.

The rotating member 10B generally comprises an axial hub 25 through which it is adapted to be constrained to rotate with a second shaft, a driven shaft, for example, in practice the input shaft of the gearbox when fitted to an automotive vehicle, and a ring 27 coupled transversely to the hub 25 by an annular flange 26.

The disks 11A, usually referred to as the intermediary or outside disks, are constrained to rotate with the rotating member 10A.

They consist in practice of annular metal plates with lugs 29, 29' projecting radially from their outside perimeter from place to place, by means of which they are engaged with grooves 30, 30' of complementary profile formed axially for this purpose in the inside wall of the ring 18 of the cover 17.

It is thus through the intermediary of the latter and the screws 16 that they are constrained to rotate with the rotating member 10A.

In the embodiments shown, the lugs 29, 29' of the intermediary disks 11A and thus the grooves 30, 30' in the cover 17 are equal in number to the screws 16, each of the grooves 30, 30' being individually associated with passages 32 provided on the internal surface of the ring 18 of the cover 17 for the shank 33 of the screws 16, radially outwardly projecting bosses 34 on the ring 18 each being formed with a groove 30, 30' of this kind and a passage 32 of this kind.

In practice, for reasons which will emerge hereinafter, the grooves 30', which are equal in number to the grooves 30 and which alternate with the latter, pass radially through the ring 18 of the cover 17, in the manner of slots, and the corresponding radial lugs 29' of the intermediary disks 11A have a radial dimension which is greater than that of the lugs 29 with which they also alternate correspondingly.

The outside perimeter of the intermediary disks 11A is overall complementary, neglecting the necessary assembly clearance, to the inside wall of the ring 18 of the cover 17, which ensures that they are retained inside the latter.

In the embodiments shown two intermediary disks 11A are provided at respective axial ends of the stack of disks which these intermediary disks 11A form with the disks 11B with which they alternate.

Also, in these embodiments, it is these other disks 11B, usually called the inside disks, which carry the friction surfaces 12, the latter being attached to them by means of an adhesive, for example.

Be this as it may, at their inside perimeter, which is overall complementary to the outside surface of the ring 27 of the retaining member 10B so as to retain them, these inside disks 11B are engaged by means of a splined coupling with the ring 27, the latter having for this purpose axial grooves 35 in which are engaged teeth 36 projecting radially from the inside perimeter of the inside disks 11B.

In the embodiments shown, the engagement means adapted to axially clamp the disks 11A, 11B act on the latter through the intermediary of a pressure plate 38 which, as will be described in more detail hereinafter, is appropriately constrained to rotate with the reaction plate formed by the flange 15 of the rotating member 10A whilst being mobile axially relative thereto, and they form part of one or more annular members 39 of the kind generally referred to as diaphragm springs.

In practice, in these embodiments, two diaphragm springs 39 are thus provided, back-to-back, and each comprises a circumferentially continuous peripheral part 40 forming a Belleville spring and a central part subdivided into radial fingers 41 by slots 42 so as to constitute clutch release levers, the slots 42 broadening at their roots and forming passages of widened cross-section 49 in the vicinity of the aforementioned circumferentially continuous peripheral part 40.

The diaphragm springs 39 thus constituted are conjointly coupled to the cover 17 so as to be able to flex thereon, being attached to the transverse flange 22 of the latter by pegs 43 which are riveted by means of a tailpiece 44 to the flange 22 of the cover 17 and pass through the diaphragm springs 39 by means of passages 49 in the latter to form, beyond these diaphragm springs 39, a head 45 of larger cross-section for the latter to bear on.

In practice, the diaphragm springs 39 bear on the head 45 of the pegs 43 through the intermediary of a ring 46 and, in line with this ring, the flange 22 forms a boss 47 of rounded axial cross-section, also for the diaphragm springs 39 to bear on.

Thus the diaphragm springs 39 bear on the flange 22 of the cover 17 in the vicinity of the inside perimeter of their peripheral part forming the Belleville spring 40 and, in the vicinity of the outside perimeter of the latter, they conjointly bear on the pressure plate 38.

To this end the latter features axial annular bosses 48 disposed circularly on a common circumference and circumferentially spaced in pairs by virtue of gaps 50.

From place to place the pegs 43 are replaced by a restricted number of pegs 43' which are riveted by a tailpiece 44' to the flange 22 of the cover 17, as previously, passing through the diaphragm springs 39 by virtue of corresponding passages 49 in the latter, also as previously, and which do not offer any bearing surface to the diaphragm springs 39 since they do not feature any head of larger cross-section beyond the latter, the aforementioned pegs 43' being on the other hand adapted to constrain the pressure plate 38 and the cover 17 to rotate together.

In practice, in the embodiments shown, to the end of each of the pegs 43' there is riveted for this purpose an elastically deformable tang 52 extending generally transversely relative to the axis of the assembly, obliquely relative to a circumference of the latter passing through its median area, and coupled at its other end by a rivet 53 to the pressure plate 38, a transverse boss 54 being provided for this purpose on the latter in one of the gaps 50 separating the axial bosses 48 circumferentially in pairs.

It is therefore through the intermediary of the cover 17 that the pressure plate 38 is constrained to rotate with the flange 15 of the rotating member 10A which constitutes the reaction plate, whereas the elastically deformable tangs 52, being appropriately curved to this end, continuously urge the pressure plate 38 in the direction away from the flange 15, so as to unclamp the disks 11A, 11B.

As these arrangements do not constitute part of the present invention and are well known per se they will not be described in more detail here.

Figure 6A:
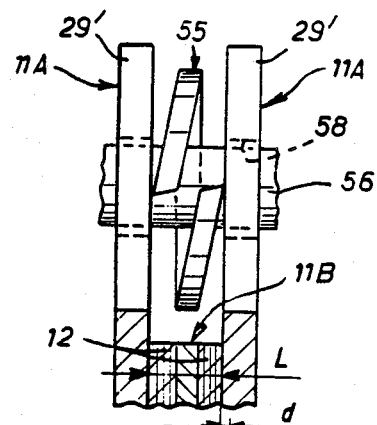
FIGS. 6A, 6B, 6C and 6D are views to a different scale corresponding to part of FIG. 3, illustrating how the elastic separator members implemented in accordance with the invention in the multiple rotating disk assembly operate.
Figure 6B:
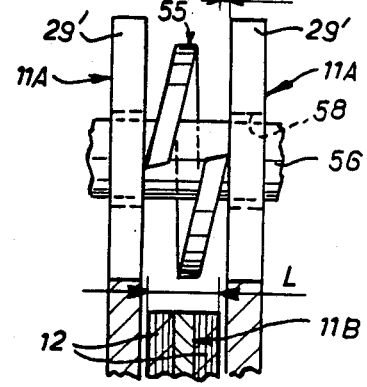
Figure 6C:
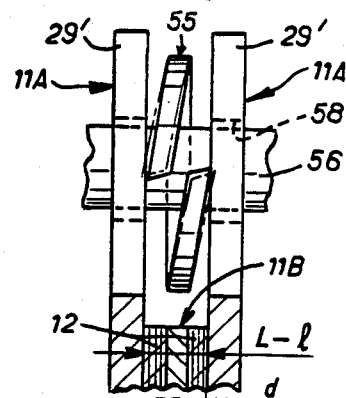
Figure 6D:
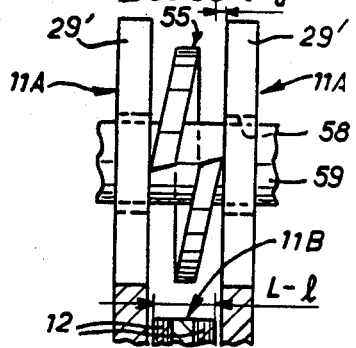

In a manner which is also known per se there are provided for the intermediary disks 11A elastic separator members 55 inserted axially between them and adapted to urge them away from one another (FIGS. 3, 6B and 6D).

In the embodiment shown in FIGS. 1 to 7, they are split elastic rings which, being separate parts distinct from the intermediary disks 11A, are retained in position by being engaged on support members 56 carried by the latter.

In practice, these support members 56 are located on the most extensive radial lugs 29' of the intermediary disks 11A and, in accordance with one aspect of the invention, they are free to move axially and radially relative to the entirety of the intermediary disks 11A.

In practice, and as is more clearly seen in FIG. 5 in the case of one of them, each of these support members 56 passes with clearance through each of the intermediary disks 11A, by virtue of a passage 58 provided for this purpose in the corresponding lug 29' of the latter.

To retain them in position axially they carry adjacent each end, beyond the corresponding end disk 11A, a retaining ring 59 which may be locked to it by a simple anchoring arrangement, for example.

In accordance with the invention the elastic members 55 constituted by the split elastic rings have an elastic limit which is sufficiently low as to be systematically exceeded on each increase in the closeness of packing of the disks 11A, 11B due to the progressive wearing of the friction surfaces 12, for at least part of the service life of the aforementioned friction surfaces 12 and for preference from the beginning of their service life.

Referring to FIG. 6A, assume that at a time T at which the disks 11A, 11B are clamped up due to the force applied by the diaphragm springs 39, two consecutive intermediary disks 11A are separated from one another by a distance L which is equal to the thickness at this time of the corresponding friction surfaces 12 and the inside disk 11B carrying the latter.

By virtue of the axial flattening applied to them by the diaphragm spring 39 through the intermediary of the intermediary disks 11A concerned, the elastic members 55 are at this time pre-stressed.

When the ends of their radial fingers 41 are actuated in order to release the clutch the diaphragm springs 39 stop applying any clamping force and the thus released elastic members 55 tend to move the intermediary disks 11A between which they are inserted away from one another by a distance d (FIG. 6B).

When the diaphragm springs 39 clamp up again to re-engage the clutch (FIG. 6C) the elastic members 55 are again pre-stressed and if this state of affairs continues for long enough for the starting up of the vehicle concerned to cause an amount 1 of wear on the friction surfaces 12, this pre-stressing is accentuated in that the elastic members 55 are then flattened to a greater degree than previously, this corresponding to a distance between the intermediary disks 11A which now have the value L - 1.

In accordance with the invention, the arrangement is such that the elastic limit of the elastic members 55 is exceeded for this elastic pre-stressing.

Consequently, on releasing the clutch and as shown in FIG. 6D the distance through which the intermediary disks 11A are moved apart by the elastic members 55 is still d, this distance d depending only on the elastic limit of these members.

FIG. 7 is a diagram in which the axial flattening e to which the elastic members 55 are subjected is plotted along the horizontal axis and the force F which must be individually applied to each of them to secure such flattening is plotted along the vertical axis.

In accordance with the invention, the arrangement is such that for at least part of the service life of the friction surfaces 12, and in practice from the beginning of this service life, the force F applied to the elastic members 55 on clamping up the disks 11A, 11B is higher than their elastic limit $F_L$.

As is well known, from this limit $F_L$ the curve representing the change in the force F as a function of the flattening e is substantially flat, the corresponding straight line II showing pronounced flattening relative to that I representing the initial elastic phase.

Let $F_1, F_2, \ldots F_N$ be the forces applied to the elastic members 55 on axial clamping of the disks 11A, 11B as the friction surfaces 12 wear.

For the force $F_1$, for example, the flattening of the elastic members 55 is $e_1$. On unclamping the disks 11A, 11B these revert elastically to a less flattened configuration $e'_1$ along a line parallel to the straight line I and this results in the intermediary disks 11A concerned being moved apart to a separation distance $d_1$ which is equal to $e_1 - e'_1$.

Likewise, for the force $F_2$, they are separated on releasing the clutch by a distance $d'_2$ equal to $e_2 - e'_2$ for the intermediary disks 11A and similarly for force $F_N$ to a separation distance $d_N$ equal to $e_N - e'_N$.

It results from what has been said hereinabove that the separation distances $d_1, d_2, \ldots d_N$ are substantially equal.

In other words, the separation effect of the elastic separator members 55 on the intermediary disks 11A on disengaging the clutch is always substantially the same however much the friction surfaces 12 may be worn.

This is why, in FIG. 6D, it has been assumed equal to that shown in FIG. 6B.

Likewise, the force $F_1, F_2, \ldots F_N$ to be applied to the elastic members 55 to flatten them on axially clamping the disks 11A, 11B varies only slightly with the degree of wear of the friction surfaces 12.

As will have been noted and as is shown in dashed line in FIG. 6C, as the friction surfaces 12 wear the elastic members 55 employed in accordance with the invention are subject to an irreversible and continuous flattening deformation in the axial direction.

On unclamping the disks 11A, 11B they therefore react with only that part of the flattening force applied to them which corresponds to their elastic limit.

Because of the freedom of movement of their support members 56 relative to the intermediary disks 11A which carry them, there is no risk of the intermediary disks 11A becoming jammed on the support members 56.

To the contrary, in view of the mechanical loads to which these intermediary disks 11A are then subjected by the support members 56, the relative separation of the intermediary disks 11A relative to one another on disengaging the clutch is favored, as is thus their separation from the inside disks 11B carrying the friction surfaces 12.

In the embodiment shown in FIG. 8 the elastic separator members 55 are simple dished elastic annular members of the Belleville spring type.

Also, in this embodiment, the support members 56 for the elastic separator members 55 have a head 60 at one end, instead of a retaining ring as previously.

In another embodiment shown in FIG. 12 the elastic separator members 55 consist of corrugated elastic rings of the type marketed under the trade name "ONDU-FLEX", for example.

Figure 9:
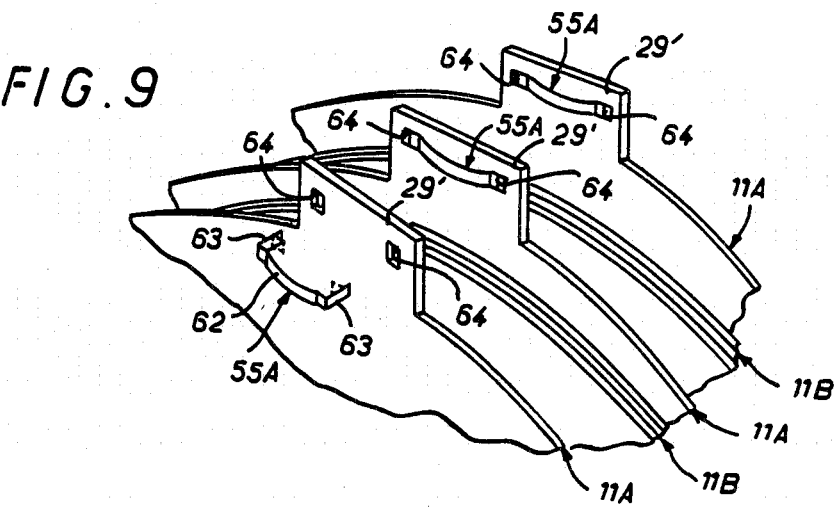
FIGS. 9, 10 and 11 are perspective partial views relating to respective further embodiments.

In another embodiment shown in FIG. 9, the elastic separator members 55 consist of leaf springs each individually carried by the intermediary disks 11A.

For example, and as shown here, each of these leaf springs comprises a median part 62, appropriately bent, and two lateral rings 63 which, after passing through the corresponding lug 29' of the intermediary disk 11A concerned by virtue of passages 64 provided for this purpose in the lug 29', are bent at right angles beyond the latter, as schematically represented in dashed line in the figure in the case of one of them.

Figure 10:
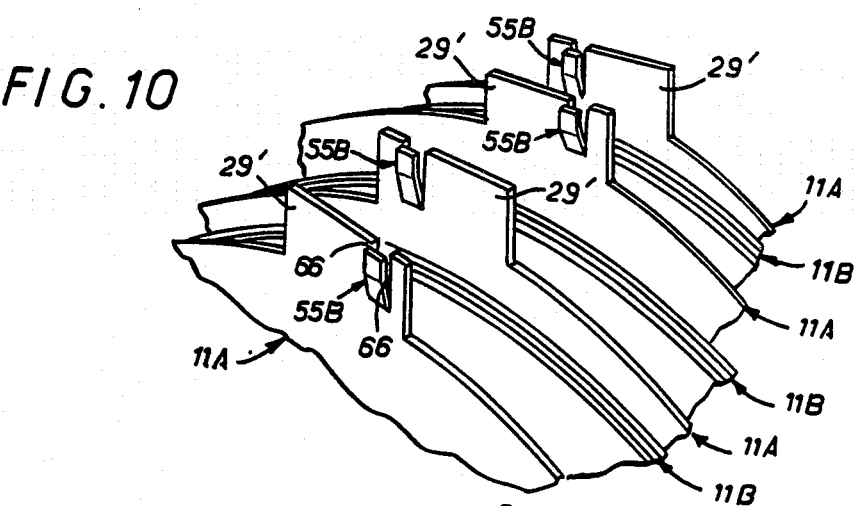
Figure 11:
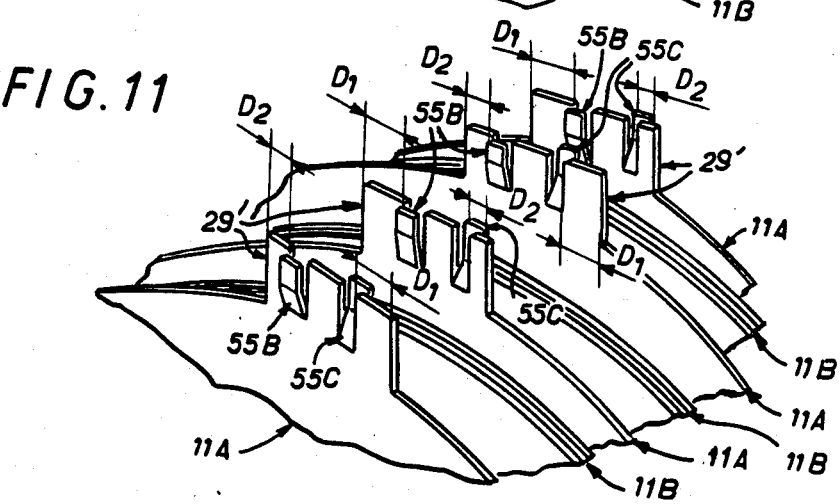

In the embodiments shown in FIGS. 10 and 11 the elastic separator members 55B, 55C are tangs constituting an integral part of the intermediary disks 11A.

For example, and as shown here, they are to this end stamped out from the lugs 29' of the intermediary disks 11A, each being delimited by two substantially radial incisions 66 in the latter.

These tangs are further appropriately deformed, as by bending, for example, so as to project axially from the lugs 29' concerned.

In the embodiment shown in FIG. 10, a single tang 55B is provided in this way on each lug 29', being circumferentially offset relative to the median area of the latter.

All these tangs 55B project axially on the same side relative to the lugs 29' concerned and, in order for them to bear on a plane part of the corresponding lug 29' of the adjacent intermediary disk 11A, they are alternately offset in opposite circumferential directions relative to the median area of the lugs 29' from one intermediary disk 11A to the next.

As a result of this, two distinct types of intermediary disk 11A are then necessary, one in which the tangs forming the elastic separator members 55 are circumferentially offset in one direction relative to the median area of the lugs 29' and the other in which they are circumferentially offset in the opposite direction.

As a variant on this (FIG. 11) a single type of intermediary disk 11A may suffice, two tangs forming elastic separator members 55B, 55C being stamped out from the same lug 29' of the intermediary disk 11A, these tangs being at respective circumferential distances D1, D2 from the corresponding circumferential edges of the lugs 29', projecting in opposite axial directions on the latter relative to one another, the intermediary disks 11A being alternately turned over through 180° relative to one another, by rotation through 180° about a diameter.

Thus from one intermediary disk to another the tangs forming the elastic separator members 55B, 55C may bear in the axial direction on the plane parts of the lugs 29' of the latter.

It will be understood that various changes in the details, materials and arrangements of parts which have been herein described and illustrated in order to explain the nature of the invention may be made by those skilled in the art within the principle and scope of the invention as expressed in the appended claims.

Also, applications of the invention are not limited to multi-disk clutches only as specifically considered hereinabove, but extend more generally to all multiple rotating disk assemblies, including multi-disk brakes, for example.

We claim:

1. Multiple rotating disk assembly comprising two coaxial members, a stack of disks including first disks constrained to rotate with a first of said coaxial members and second disks alternating with said first disks and constrained to rotate with a second of said coaxial members, said first and second disks being movable axially relative to said coaxial members, friction surfaces on transverse sides of at least some of said disks, elastic engagement means for secure axial clamping of said friction surfaces between said disks and elastic separator means disposed between said first disks to urge said first disks away from one another, the clamping force normally exerted by said elastic engagement means exceeding the elastic limit of said elastic separator means so that the force said elastic engagement means has to apply to overcome said elastic separator means remains generally constant regardless of the degree of wear of said friction surface.

2. Assembly according to claim 1, wherein said elastic separator means constitutes members distinct from said first disks, said elastic separator means being received on axial support members carried by said first disks, said axial support members being floatingly mounted for movement in the axial direction relative to said first disks.

3. Assembly according to claim 2, wherein said support members each pass with clearance through said first disks.

4. Assembly according to claim 2, wherein said elastic separator members are Belleville springs.

5. Assembly according to claim 2, wherein said elastic separator members are split elastic rings.

6. Assembly according to claim 2, wherein said elastic separator members are corrugated elastic rings.

7. Assembly according to claim 1, wherein said elastic separator means are leaf springs individually carried by said first disks.

8. Assembly according to claim 1, wherein said elastic separator means are tangs which constitute integral parts of said first disks.

9. Assembly according to claim 8, wherein said first disks have radially projecting lugs on their outside perimeter, said first coaxial member has corresponding axial grooves in which said lugs are engaged and said tangs are stamped portions of said lugs and axially offset relative to a median part of a respective lug.

10. Assembly according to claim 8, wherein two of said tangs are stamped portions of each of said lugs at different circumferential distances from the corresponding circumferential edges of said lug.

11. Assembly according to claim 10, wherein said two tangs project from said lug in opposite axial directions.

* * * * *